(12) United States Patent
Tecu

(10) Patent No.: US 11,080,547 B2
(45) Date of Patent: Aug. 3, 2021

(54) AUGMENTED REALITY DOCUMENT PROCESSING

(71) Applicant: Konica Minolta Laboratory U.S.A., Inc., San Mateo, CA (US)

(72) Inventor: Kirk Steven Tecu, Longmont, CO (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 279 days.

(21) Appl. No.: 16/235,337

(22) Filed: Dec. 28, 2018

(65) Prior Publication Data

US 2020/0210744 A1 Jul. 2, 2020

(51) Int. Cl.
*G06K 9/46* (2006.01)
*G06F 16/93* (2019.01)

(52) U.S. Cl.
CPC ............... *G06K 9/46* (2013.01); *G06F 16/93* (2019.01); *G06K 2209/01* (2013.01)

(58) Field of Classification Search
CPC .. G06F 16/93; G06K 2209/01; G06K 9/3233; G06K 9/46
See application file for complete search history.

(56) References Cited

U.S. PATENT DOCUMENTS

| | | | | |
|---|---|---|---|---|
| 7,143,109 | B2* | 11/2006 | Nagral | G06F 16/258 |
| 9,712,693 | B2* | 7/2017 | Sato | G06K 9/2081 |
| 2012/0036130 | A1* | 2/2012 | Light | G06F 40/295 |
| | | | | 707/736 |
| 2012/0042288 | A1* | 2/2012 | Liao | H04N 1/00241 |
| | | | | 715/863 |
| 2015/0199164 | A1* | 7/2015 | Moore | G06F 3/1454 |
| | | | | 345/1.1 |
| 2015/0373217 | A1* | 12/2015 | Dombrowski | H04N 1/00588 |
| | | | | 358/498 |
| 2018/0165255 | A1* | 6/2018 | Gafford | G06F 40/174 |

\* cited by examiner

*Primary Examiner* — Shaghayegh Azima
(74) *Attorney, Agent, or Firm* — Osha Bergman Watanabe & Burton LLP

(57) ABSTRACT

A method for processing an image of a physical document to enable digital searching of the physical document includes: obtaining a digital copy of the physical document; receiving an instruction to search for a point of interest in the physical document; imaging the physical document and determining that the point of interest is on a surface of the physical document; and projecting, using a projector and onto the surface of the physical document, a visual-aid component that physically overlaps with the point of interest to highlight the point of interest on the surface of the physical document.

17 Claims, 6 Drawing Sheets

AUGMENTED REALITY DOCUMENT PROCESSING

BACKGROUND

Augmented Reality (AR) enables users to generate an interactive experience of a real world environment by superimposing a computer-generated image over physical objects within the users' views. However, the use of AR glasses may cause discomfort for certain users.

Computerized search functions (i.e., digital document search workflows) allow users to easily locate points of interests (e.g., a text character, a non-text character, a table, a figure, a graph, etc.) within electronic documents without requiring the user to manually inspect the actual document content. Regardless, users still wish to have access to these computerized search functions while handling and interacting with only physical documents.

SUMMARY

In general, in one aspect, the invention relates to a method for processing an image of a physical document to enable digital searching of the physical document. The method comprising: obtaining a digital copy of the physical document; receiving an instruction to search for a point of interest in the physical document; imaging the physical document and determining that the point of interest is on a surface of the physical document; and projecting, using a projector and onto the surface of the physical document, a visual-aid component that physically overlaps with the point of interest to highlight the point of interest on the surface of the physical document.

In general, in one aspect, the invention relates to a non-transitory computer readable medium (CRM) storing computer readable program code for processing an image of a physical document to enable digital searching of the physical document embodied therein. The computer readable program code causes a computer to: obtain a digital copy of the physical document; receive an instruction to search for a point of interest in the physical document; image the physical document and determine that the point of interest is on a surface of the physical document; and project, using a projector and onto the surface of the physical document, a visual-aid component that physically overlaps with the point of interest to highlight the point of interest on the surface of the physical document.

In general, in one aspect, the invention relates to a system for processing an image of a physical document to enable digital searching of the physical document. The system comprising: a memory; and a computer processor connected to the memory. The computer processor: obtains a digital copy of the physical document; receives an instruction to search for a point of interest in the physical document; images the physical document and determines that the point of interest is on a surface of the physical document; and projects, using a projector and onto the surface of the physical document, a visual-aid component that physically overlaps with the point of interest to highlight the point of interest on the surface of the physical document.

Other aspects of the invention will be apparent from the following description and the appended claims.

DETAILED DESCRIPTION

Figure 1:
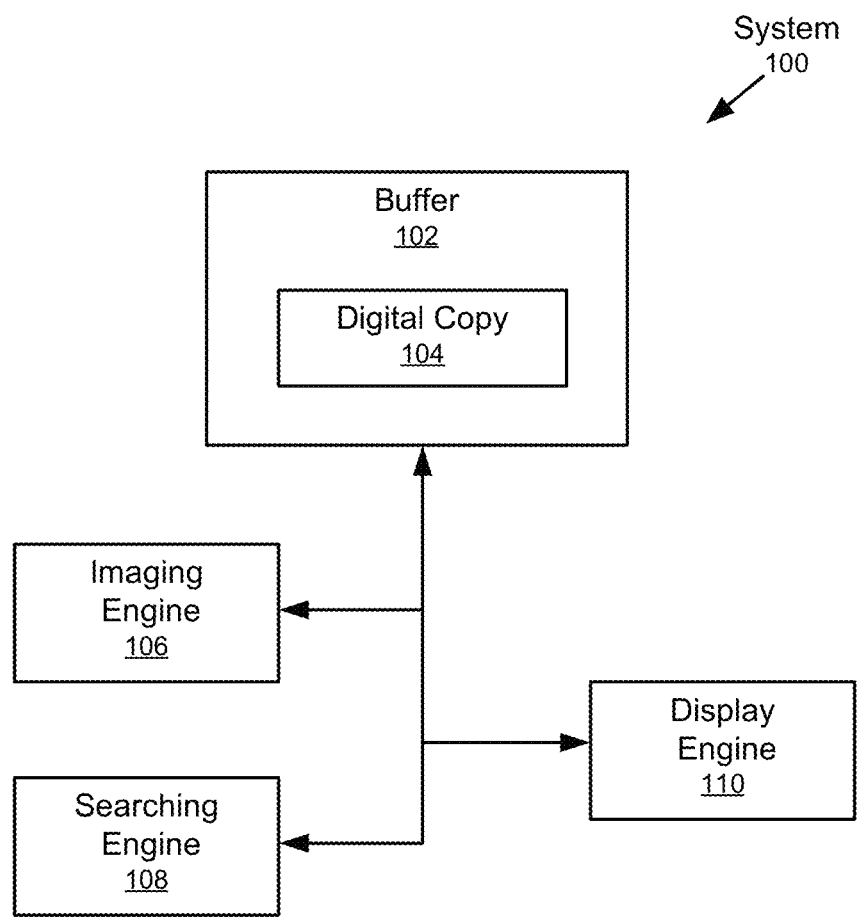
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method, a non-transitory computer readable medium (CRM), and a system for processing an image of a physical document to enable digital searching of the physical document. Specifically, a single physical document or a stack of physical documents is imaged using a Projection with Interactive Capture (PIC) device and stored as an electronic document (i.e., a digital copy of the physical documents) in a memory. The PIC device, described in more detail below in FIG. 3, includes an imaging component (e.g., a 2-dimensional and/or 3-dimensional imager) and a projection component (e.g., a projector) that work in tandem to create an AR environment without the need for AR glasses. Upon receiving user instructions to search for a point of interest (e.g., a text character, a non-text character, a table, a figure, a graph, etc.) within the content of the physical document or stack, the PIC device implements a digital document search workflow on the digital copy and outputs instructions to identify the point of interest. Once the user reaches the physical document containing the point of interest, the PIC device highlights, using the projector, the point of interest on the surface of the physical document.

FIG. 1 shows a system (100) in accordance with one or more embodiments of the invention. As shown in FIG. 1, the system (100) has multiple components, including, for example, a buffer (102), an imaging engine (106), a searching engine (108), and a display engine (110). Each of these components (102, 106, 108, and 110) may be located on the same computing device (e.g., personal computer (PC), laptop, tablet PC, smart phone, multifunction printer, kiosk, server, a PIC device, etc.) or on different computing devices connected by a network of any size having wired and/or wireless segments. Each of these components is discussed below.

The buffer (102) may be implemented in hardware (i.e., circuitry), software, or any combination thereof. The buffer (102) is configured to store a digital copy (104) of a single physical document or a stack of physical documents that has been imaged. Multiple digital copies (104) may be stored in the buffer (102).

The digital copy (104) may be an electronic version of physical documents that have been imaged. The digital copy (104) may be saved in the buffer (102) in any imaging format (e.g., a JPEG image, a GIF image, a BMP image, a TIFF image, a PDF document, etc.). The physical documents may be single-sided, double-sided, or a combination of single-sided and double-sided documents.

The system (100) includes the imaging engine (106). The imaging engine (106) may be implemented in hardware (i.e., circuitry), software, or any combination thereof. The imaging engine (106) images the physical documents to generate the digital copy (104).

Further, the imaging engine (106) may include a 2-dimensional and/or 3-dimensional imager (e.g., a camera, a combination of one or more cameras, etc.) that is able to capture a digital image of the physical documents.

The digital copy (104) is generated by the imaging engine (106). Alternatively, the digital copy (104) may be generated by an external device such as a multifunctional peripheral (e.g., a printer with a scanner) or an automatic document feeder (ADF) in communication with the system (100).

The system (100) further includes the searching engine (108). The searching engine (108) may be implemented in hardware (i.e., circuitry), software, or any combination thereof. The searching engine (108) performs a computerized search function (i.e., a digital document search workflow) on the contents within the digital copy (104).

The searching engine (108) performs an optical character recognition and non-text content analysis on the digital copy (104) to identify contents (e.g., a text character, a non-text character, a table, a figure, a graph, etc.) within the digital copy (104). Once identified, the contents within the digital copy (104) become searchable by the searching engine (108). Any imaging program (e.g., a word recognition program, a table recognition program, etc.) that is able to accurately identify contents within the digital copy (104) may be utilized by the searching engine (108).

Upon receiving a user instruction to search for a point of interest (e.g., a text character, a non-text character, a table, a figure, a graph, etc.) within the digital copy (104), the searching engine (108) searches the digital copy (104) to identify all instances of the point of interest within the digital copy (104). The user instructions may be input through any input device (e.g., a keyboard, a tablet, a microphone, etc.) to the searching engine (108).

The searching engine (108) communicates an information including a number of instances of the point of interest to the user. The instructions may be communicated using a visual display of text, using audio communication, a combination of visual text and audio, or any suitable method that is able to clearly convey the information to the user. The point of interest may only appear once (i.e., only one instance of point of interest) within the digital copy (104). Alternatively, the point of interest may appear multiple times (i.e., multiple instances of the point of interest) within the digital copy (104).

The searching engine (108) further receives an instruction from the user to identify one of the instances of the point of interest as a requested instance of the point of interest. If only a single instance of the point of interest exists within the digital copy (104), the single instance is identified by the searching engine (108) as the requested instance. Alternatively, the searching engine (108) waits to receive an instruction from the user to designate the single instance as the requested instance.

The searching engine (108) further identifies the location of the requested instance within the digital copy (104) and generates an instruction that includes information of the physical location of the requested instance. The instructions may be communicated using a visual display of text, using audio communication, a combination of visual text and audio, or any suitable method that is able to clearly convey the instructions to the user.

In the event that a stack of physical documents is being imaged, the instruction generated by the searching engine (108) may include information that varies in specificity. The instructions may include information that instructs the user to traverse X % of the stack where X is any positive integer greater than zero. For example, assume that the point of interest is approximately 60% deep within the stack. The instructions generated by the searching engine would be, for example, to "traverse 60% of the stack."

Alternatively, the instructions may include information that instructs the user to traverse N pages in any direction of the stacks where N is any positive integer greater than zero but less than a total number of pages of the stack and/or the total number of pages left in the stack. For example, assume that the point of interest is 5 pages down from a top-most page of the stack that is currently being imaged. The instructions generated by the searching engine would, for example, be to "go forward 5 pages." As another example, assume that the user has already traversed through part of the stack and the point of interest is identified on 2 pages above the current page that the user is on. The instructions generated by the searching engine would be, for example, to "go back 2 pages."

The searching engine (108) may compile the instructions using a combination of the above and/or any manner that would assist that user in correctly identifying the location of the point of interest within the stack of physical documents.

The stack may be continuously imaged by the imaging engine (106) while the user traverses the stack and the searching engine (108) may be continuously updating the instructions to locate the point of interest based on the top-most page of the stack being imaged. Alternatively, the imaging engine (106) only images the stack when it has determined that the user has stopped traversing the stack (e.g., when a part of the user's body is not detected in the image, when the same image of the stack is continuously imaged for a predetermined period, etc.) and the searching engine (108) updates the instructions to locate the point of interest only when the stack is imaged.

The requested instance of the point of interest may be given the highest priority by the searching engine (108). For example, assume that multiple instances of the point of interest exists and that the user has traversed too far into the stack and arrived at an instance of the point of interest different from the requested instance. The searching engine (108) gives higher priority to the requested instance compared to the instance on the current page being imaged, and generates updated instructions to instruct the user to locate the requested instance.

The system (100) further includes the display engine (110). The display engine (110) may be implemented in hardware (i.e., circuitry), software, or any combination thereof. The display engine (110) displays one or more lights, effects, and/or images to generate an AR environment around the stack of the physical documents. Through the projection of the AR environment by the display engine (110), AR glasses are not needed. This is exemplified in more detail below in FIG. 3.

The display engine (110) may comprise a projector. The display engine (110) projects, using the projector, one or more of the lights, effects, and/or images to display the instructions generated by the searching engine (108) onto a surface within a predetermined distance from the stack. The predetermined distance may be any distance within the coverage of the projector that does not overlap with an area occupied by the physical document or the stack. This is exemplified in more detail below in FIG. 4B.

Further, the display engine (110) projects, using the projector, one or more of the lights, effects, and/or images to highlight the point of interest and a predetermined area around the point of interest on a surface of the physical document. The predetermined area around the point of interest may be any size that does not overlap with any other content and that would easily let the user determine that the point of interest is being highlighted by the display engine (110). This is exemplified in more detail below in FIG. 4C.

Only a single instance of the point of interest appearing on the physical document may be highlighted at any given time. Alternatively, multiple instances of the point of instance appearing on the physical document may be highlighted at the same time.

Although the system (100) is shown as having four components (102, 106, 108, 110), in other embodiments of the invention, the system (100) may have more or fewer components. Further, the functionality of each component described above may be split across components. Further still, each component (102, 106, 108, 110) may be utilized multiple times to carry out an iterative operation.

Figure 2:
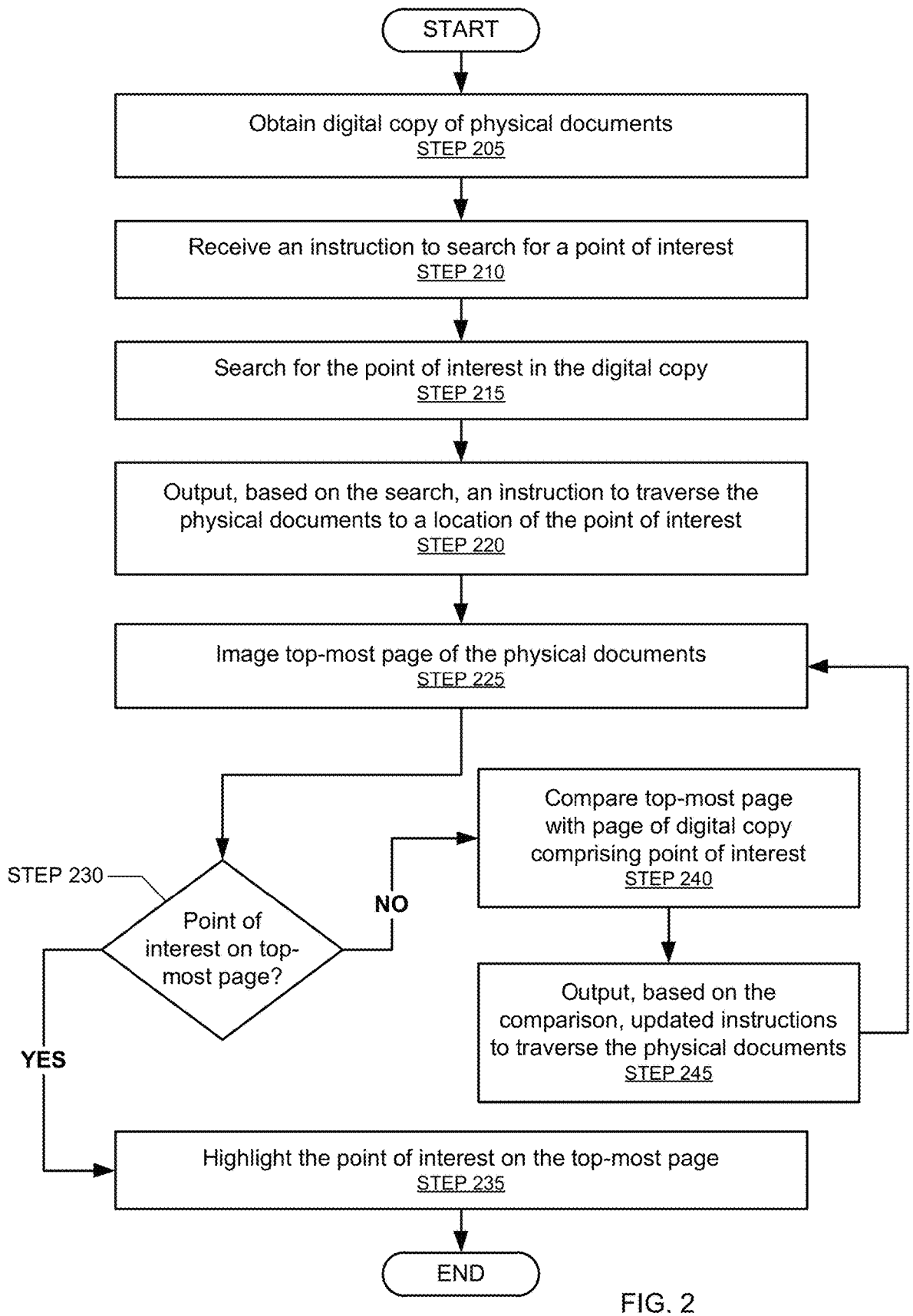
FIG. 2 shows a flowchart in accordance with one or more embodiments of the invention.

FIG. 2 shows a flowchart in accordance with one or more embodiments of the invention. Specifically, the flowchart depicts a process for processing an image of a physical document to enable digital searching of the physical document. One or more of the steps in FIG. 2 may be performed by the components of the system (100), discussed above in reference to FIG. 1. In one or more embodiments of the invention, one or more of the steps shown in FIG. 2 may be omitted, repeated, and/or performed in a different order than the order shown in FIG. 2. Accordingly, the scope of the invention should not be considered limited to the specific arrangement of steps shown in FIG. 2.

Initially, a digital copy of a stack of physical documents is obtained (STEP 205). The digital copy may be obtained (e.g., downloaded, scanned, etc.) from any source and may be of any size or format. The digital copy may include an image of each page within the stack of physical documents. An optical character recognition and non-text content analysis on the digital copy to identify contents (e.g., a text character, a non-text character, a table, a figure, a graph, etc.) within the digital copy.

In STEP 210, as discussed above in reference to FIG. 1, an instruction is received from a user to search for a point of interest within the stack (i.e., a requested point of interest). The instructions may be received via direct input through an input device (e.g., a keyboard, a microphone, a touch pad, etc.).

In STEP 215, as discussed above in reference to FIG. 1, a search is conducted within the stack for the requested point of interest received in STEP 210 and an instruction to traverse the stack to a location of the point of interest in the stack is output (e.g., projected) to the user in STEP 220. If the point of interest does not exist within the stack, a notification that the point of interest does not exist within the stack is projected instead of the instructions.

In STEP 225, as discussed above in reference to FIG. 1, a top-most page of the stack is imaged to determine if the location of the point of interest has been reached and a determination is made in STEP 230 to determine whether the point of interest is on the top-most page being imaged.

The stack may be continuously imaged while the user traverses the stack and the instructions to locate the point of interest may be continuously updated based on the top-most page of the stack that is being imaged. Alternatively, the stack is only imaged when the user has stopped traversing the stack and the instructions to locate the point of interest are updated only when the stack is imaged.

In the event that the determination in STEP 230 is YES, the process proceeds to STEP 235 where, as discussed above in reference to FIG. 1, the point of interest is highlighted on a surface of the top-most page of the stack for the user to view.

In the event that the determination in STEP 230 is NO, the top-most page is compared with a page in the digital copy that includes the point of interest. Then in STEP 245, an updated instruction to traverse the stack is output (e.g., communicated) to the user and the process returns to STEP 225.

The requested instance of the point of interest will have the highest priority. For example, assume that multiple instances of the point of interest exist and that the user has traversed too far into the stack and arrived at an instance of the point of interest different from the requested instance. The requested instance will be given higher priority than the instance on the current page being imaged. As a result, the updated instructions generated in STEP 245 will be based on the requested instance.

In the event that multiple instances of the point of interest exist within the stack, the process of FIG. 2 is repeated for each instance of the point of interest once an instruction to look for a different instance (e.g., a previous instance, a next instance, a second instance, a fifth instance, etc.) is received from the user.

Although the above process of one or more embodiments is used to discuss a situation with a stack of physical documents, the same process may be applied to a situation where only a single physical document is being searched. When only a single physical document is being searched certain steps (e.g., STEPS 220, 230, 240, and 245) within the flowchart of FIG. 2 may be omitted or altered. For example, in STEP 220, an instruction to traverse the stack will not be output but a notification that the point of interest does not exist within the stack will be projected if the point of interest does not exist.

Figure 3:
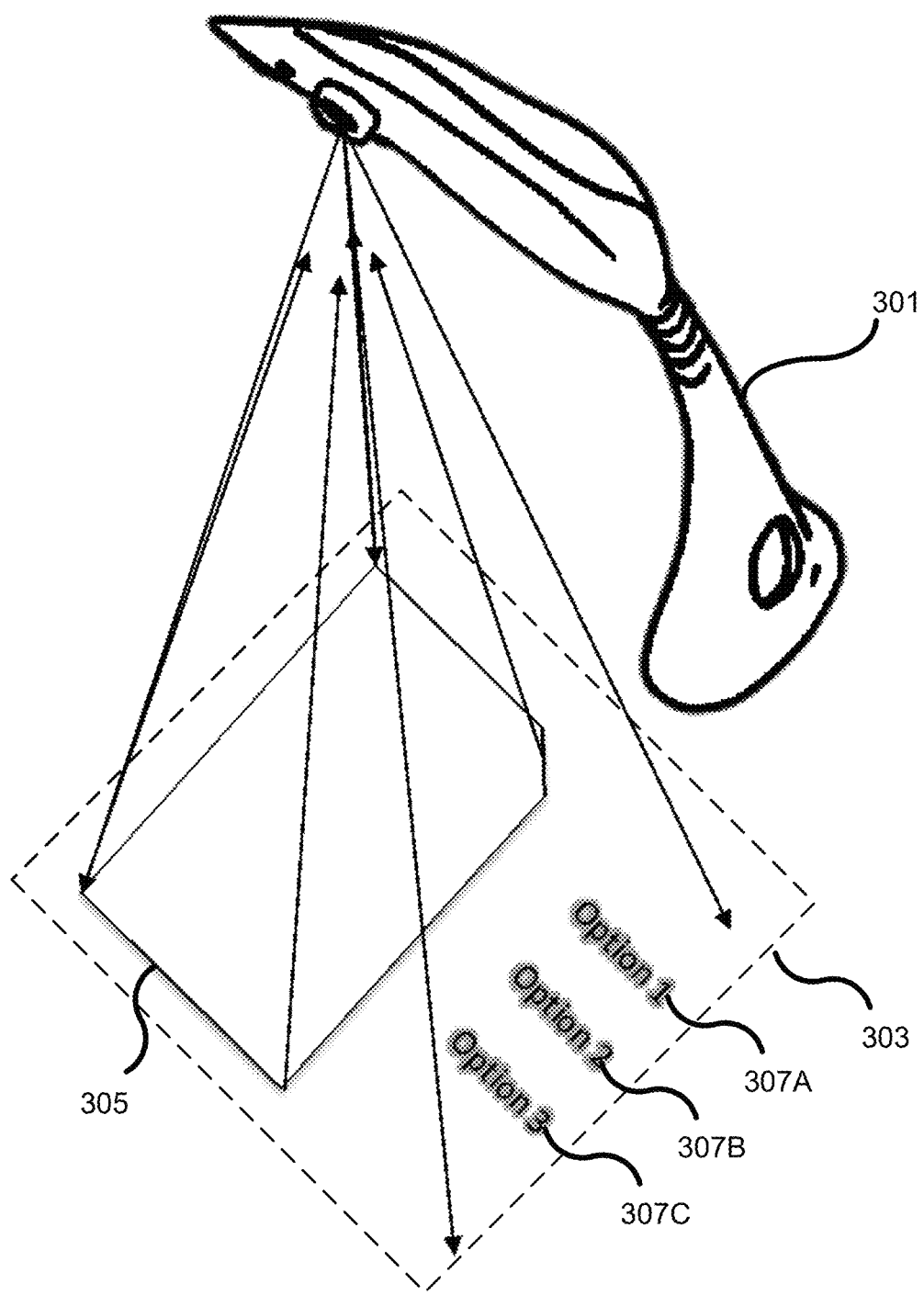
FIG. 3 shows an implementation example in accordance with one or more embodiments of the invention.

FIG. 3 shows an implementation example in accordance with one or more embodiments of the invention. As shown in FIG. 3, there exists a Projection with Interactive Capture (PIC) device (301) including an imaging component (e.g., a 2-dimensional and/or 3-dimensional imager) and a projection component (e.g., a projector) that work in tandem to create an AR environment (303) around a predetermined area surrounding a physical document (305). Digital content (307A-307C) is projected (i.e., displayed) to a user within the AR environment (303). The configuration shown in FIG. 3 enables the bridging of the physical to digital world using AR without the need to wear AR glasses. Further, the PIC device may be controlled using the system (100) as discussed above in reference to FIG. 1.

Figure 4A:
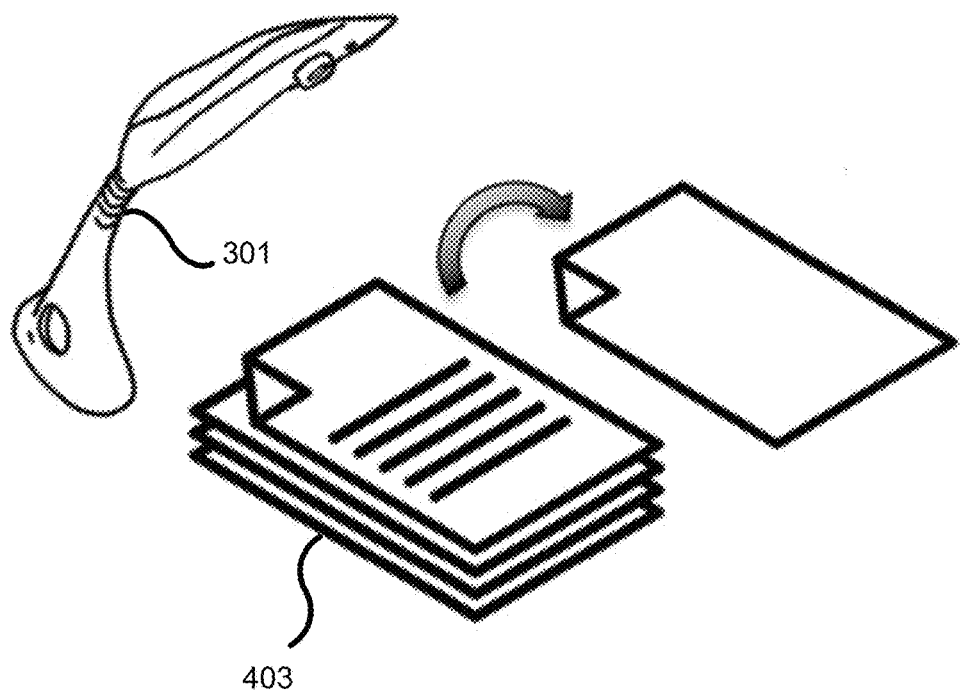
FIGS. 4A to 4C show additional implementation examples in accordance with one or more embodiments of the invention.
Figure 4B:
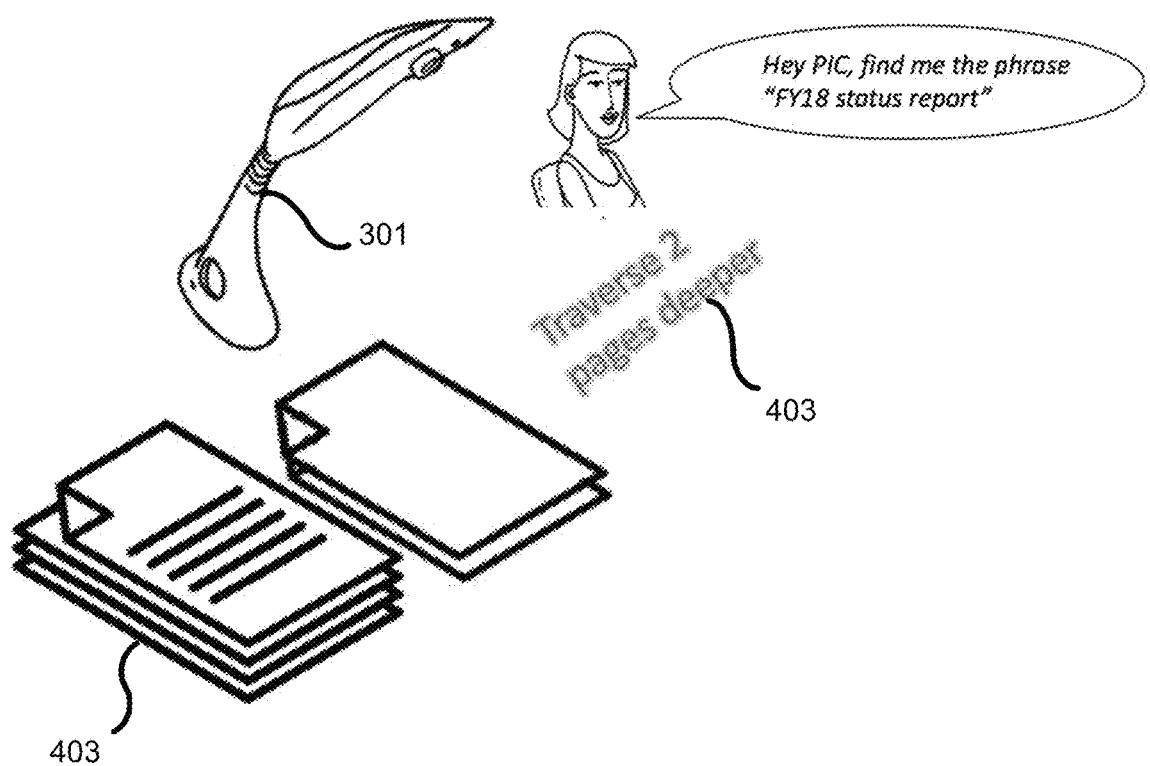
Figure 4C:
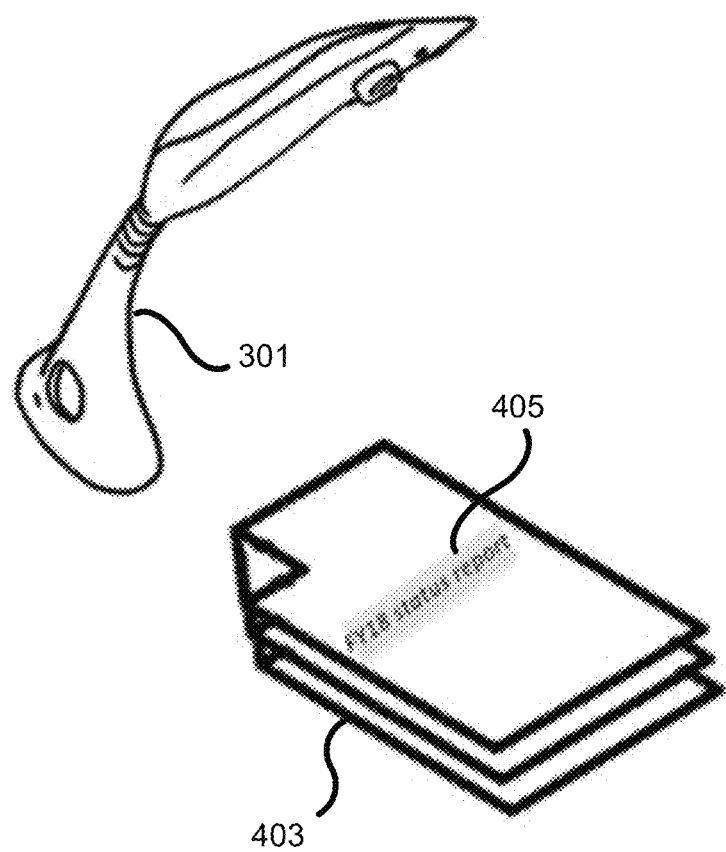

FIGS. 4A to 4C show an implementation example according with one or more embodiments. As shown in FIG. 4A, a stack of physical documents (403) is imaged by the PIC device (301) discussed above with reference to FIG. 3. The PIC device (301) creates a digital copy of the stack (403) once each page of the stack (403) has been imaged.

FIG. 4B shows the PIC device (301) projecting a set of instructions (403) for the user to traverse the stack (403) in order to reach a point of interest in response to receiving instructions from a user. As seen in FIG. 4B, the user issues a voice command for the PIC device (301) to locate the phrase "FY18 status report" (i.e., the point of interest) within the stack (403). Upon searching the digital copy of the stack (403) and imaging the top-most page of the stack (403), the PIC device (301) projects the instructions (403) instructing the user to "traverse 2 pages deeper" in order to reach the point of interest. The instructions (403) may be relayed by the PIC device (301) in audio form.

FIG. 4C shows the PIC device (301) projecting a highlighted area (405) upon the user reaching the page within the stack (403) that includes the point of interest. As seen in FIG. 4C, the user has reached the page in the stack (403) that includes the phrase "FY18 status report." In response to imaging the page and determining that the page includes the phrase, the PIC device (301) projects one or more of a light, an effect, and/or an image onto the phrase to generate the highlighted area (405) such that the phrase is clearly identified on the surface of the stack (403) for the user to view.

Figure 5:
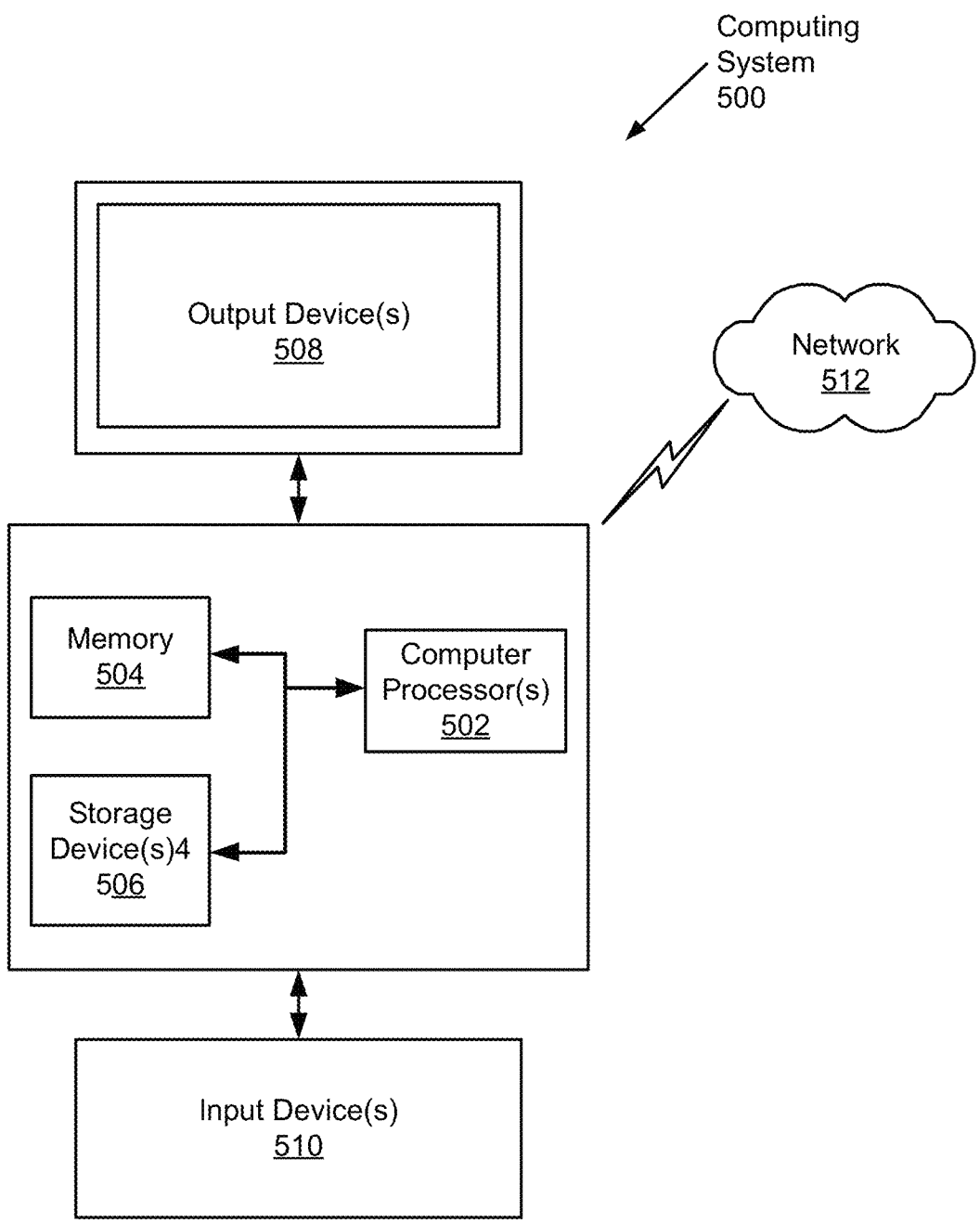
FIG. 5 shows a computing system in accordance with one or more embodiments of the invention.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 5, the computing system (500) may include one or more computer processor(s) (502), associated memory (504) (e.g., random access memory (RAM), cache memory, flash memory, etc.), one or more storage device(s) (506) (e.g., a hard disk, an optical drive such as a compact disk (CD) drive or digital versatile disk (DVD) drive, a flash memory stick, etc.), and numerous other elements and functionalities. The computer processor(s) (502) may be an integrated circuit for processing instructions. For example, the computer processor(s) may be one or more cores, or micro-cores of a processor. The computing system (500) may also include one or more input device(s) (510), such as a touchscreen, keyboard, mouse, microphone, touchpad, electronic pen, or any other type of input device. Further, the computing system (500) may include one or more output device(s) (508), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (500) may be connected to a network (512) (e.g., a local area network (LAN), a wide area network (WAN) such as the Internet, mobile network, or any other type of network) via a network interface connection (not shown). The input and output device(s) may be locally or remotely (e.g., via the network (512)) connected to the computer processor(s) (502), memory (504), and storage device(s) (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (500) may be located at a remote location and be connected to the other elements over a network (512). Further, one or more embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

One or more embodiments of the invention may have one or more of the following advantages: the ability to bridge the physical to the digital world when a user prefers to interact with physical copies of documents; the ability to allow a user to interact with an AR environment without wearing AR glasses; the ability to process physical documents using computerized search functions without knowing a location of the digital copy of the physical documents; the ability to process physical documents using computerized search functions without direct access to the digital copy of the physical documents (i.e., when only the physical copy of the documents is available to a user); the ability to process a physical document using computerized search functions when a user prefers to handle physical copies of a document; etc.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for processing an image of a physical document to enable digital searching of the physical document, comprising:
   obtaining a digital copy of the physical document;
   receiving an instruction to search for a point of interest in the physical document;
   imaging the physical document and determining that the point of interest is on a surface of the physical document; and
   projecting, using a projector and onto the surface of the physical document, a visual-aid component that physically overlaps with the point of interest to highlight the point of interest on the surface of the physical document, wherein
   the physical document is a page within a stack of physical documents,
   the digital copy includes all pages in the stack, and the method further comprises:
   imaging a top-most page of the stack and determining that the point of interest is not on the top-most page;
   imaging, after removing the top-most page of the stack in response to determining that the point of interest is not on the top-most page, a next-top-most page of the stack under the removed top-most page to find the point of interest;
   determining that the point of interest is on a surface of the next-top-most page; and projecting, using the projector and onto the surface of the next-top-most page, the visual aid component to highlight the point of interest on the surface of the next-top-most page.

2. The method of claim 1, further comprising:
comparing, in response to determining that the point of interest is not on the top-most page, the top-most page with a page in the digital copy of the stack that comprises the point of interest; and outputting, based on the comparison, an instruction to remove pages from the stack to reach a page within the stack with the point of interest.

3. The method of claim 2, wherein the instruction to remove pages from the stack is projected, by a projector and within a predetermined distance from the physical documents, onto a same surface that the physical documents are disposed on.

4. The method of claim 3, wherein the instruction to remove pages from the stack to is continuously projected and updated until a determination is made that the point of interest is on a page within the stack that is now a new top-most page after the pages are removed.

5. The method of claim 1, wherein: the highlighted point of interest is a first occurrence of the point of interest in the stack, and the method further comprises: receiving an instruction to search for a second occurrence of the point of interest in the stack; outputting, based on searching the digital copy of the stack for the second occurrence, an instruction to remove pages from the stack to reach a page within the stack with the second occurrence; imaging the stack after removing the pages from the stack to reach the page within the stack with the second occurrence and determining that the second occurrence is on a surface of a new top-most page of the stack after the pages have been removed; and projecting, using the projector and onto the surface of the new top-most page, the visual aid component to highlight the second occurrence on the surface of the new top-most page.

6. The method of claim 1, wherein obtaining the digital copy of the physical document further comprises: imaging and digitizing each page of the stack; storing the imaged and digitized stack in a memory as the digital copy of the physical documents; imaging the top-most page of the stack; comparing the top-most page of the stack to pages of the digital copy of the stack; determining, based on the comparison, that the top-most page of the stack matches one of the pages of the digital copy of the stack; and retrieving, based on the determination, the digital copy of the stack from the memory.

7. The method of claim 1, wherein the instruction to search for the point of interest in the physical document is received as a voice command from a user.

8. The method of claim 1, wherein the physical documents are imaged using a Projection with Interactive Capture (PIC) device that comprises an imager and the projector, and an optical character recognition and non-text content analysis is used to search the digital copy.

9. The method of claim 1, wherein the point of interest is one selected from a group consisting of: a text character, a non-text character, a string of text, an image, a graph, and a table.

10. The CRM of claim 1, wherein the computer readable program code further causes the computer to:
compare, in response to determining that the point of interest is not on the top-most page, top-most page with a page in the digital copy of the stack that comprises the point of interest; and output, based on the comparison, an instruction to remove pages from the stack to reach a page within the stack with the point of interest.

11. A non-transitory computer readable medium (CRM) storing computer readable program code for processing an image of a physical document to enable digital searching of the physical document embodied therein, the computer readable program code causes a computer to:
obtain a digital copy of the physical document; receive an instruction to search for a point of interest in the physical document;
image the physical document and determine that the point of interest is on a surface of the physical document; and
project, using a projector and onto the surface of the physical document, a visual-aid component that physically overlaps with the point of interest to highlight the point of interest on the surface of the physical document, wherein
the physical document is a page within a stack of physical documents, the digital copy includes all pages in the stack, and the computer readable program code further causes the computer to:
image a top-most page of the stack and determining that the point of interest is not on the top-most page;
image, after removing the top-most page of the stack in response to determining that the point of interest is not on the top-most page, a next-top-most page of the stack under the removed top-most page to find the point of interest;
determine that the point of interest is on a surface of the next-top-most page; and project, using the projector and onto the surface of the next-top-most page, the visual aid component to highlight the point of interest on the surface of the next-top-most page.

12. The CRM of claim 11, wherein the highlighted point of interest is a first occurrence of the point of interest in the stack, and the computer readable program code further causes the computer to: receive an instruction to search for a second occurrence of the point of interest in the stack; output, based on searching the digital copy of the stack for the second occurrence, an instruction to remove pages from the stack to reach a page within the stack with the second occurrence; image the stack after removing the pages from the stack to reach the page within the stack with the second occurrence and determining that the second occurrence is on a surface of a new top-most page of the stack after the pages have been removed; and project, using the projector and onto the surface of the new top-most page, the visual aid component to highlight the second occurrence on the surface of the new top-most page.

13. The CRM of claim 11, wherein the physical documents are imaged using a Projection with Interactive Capture (PIC) device that comprises an imager and the projector, an optical character recognition and non-text content analysis is used to search the digital copy, and the point of interest is one selected from a group consisting of: a text character, a non-text character, a string of text, an image, a graph, and a table.

14. A system for processing an image of a physical document to enable digital searching of the physical document, the system comprising:
a memory; and
a computer processor connected to the memory, wherein the computer processor:
obtains a digital copy of the physical document;
receives an instruction to search for a point of interest in the physical document;
images the physical document and determines that the point of interest is on a surface of the physical document; and
projects, using a projector and onto the surface of the physical document, a visual-aid component that physically overlaps with the point of interest to highlight the point of interest on the surface of the physical document, the physical document is a page within a stack of physical documents, the digital copy includes all pages in the stack, and the computer processor further:

images a top-most page of the stack and determining that the point of interest is not on the top-most page;

images, after removing the top-most page of the stack in response to determining that the point of interest is not on the top-most page, a next-top-most page of the stack under the removed top-most page to find the point of interest;

determines that the point of interest is on a surface of the next-top-most page; and projects, using the projector and onto the surface of the next-top-most page, the visual aid component to highlight the point of interest on the surface of the next-top-most page.

15. The system of claim 14, wherein the computer processor further;

compares, in response to determining that the point of interest is not on the top-most page, the top-most page with a page in the digital copy of the stack that comprises the point of interest; and outputs, based on the comparison, an instruction to remove pages from the stack to reach a page within the stack with the point of interest.

16. The system of claim 14, wherein the highlighted point of interest is a first occurrence of the point of interest in the stack, and the computer processor further: receives an instruction to search for a second occurrence of the point of interest in the stack; outputs, based on searching the digital copy of the stack for the second occurrence, an instruction to remove pages from the stack to reach a page within the stack with the second occurrence; images the stack after removing the pages from the stack to reach the page within the stack with the second occurrence and determining that the second occurrence is on a surface of a new top-most page of the stack after the pages have been removed; and projects, using the projector and onto the surface of the new top-most page, the visual aid component to highlight the second occurrence on the surface of the new top-most page.

17. The system of claim 14, wherein the physical documents are imaged using a Projection with Interactive Capture (PIC) device that comprises an imager and the projector, the PIC device is controlled by the computer processor, an optical character recognition and non-text content analysis is used to search the digital copy, and the point of interest is one selected from a group consisting of: a text character, a non-text character, a string of text, an image, a graph, and a table.

* * * * *